(12) United States Patent
Hamada et al.

(10) Patent No.: US 10,759,047 B1
(45) Date of Patent: Sep. 1, 2020

(54) SPEED REDUCER AND ROBOT

(71) Applicant: Mitsubishi Electric Corporation, Chiyoda-ku (JP)

(72) Inventors: Akiko Hamada, Tokyo (JP); Mineo Higuchi, Kagawa (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 7 days.

(21) Appl. No.: 16/325,225

(22) PCT Filed: Jun. 27, 2017

(86) PCT No.: PCT/JP2017/023626
§ 371 (c)(1),
(2) Date: Feb. 13, 2019

(87) PCT Pub. No.: WO2018/074008
PCT Pub. Date: Apr. 26, 2018

(30) Foreign Application Priority Data

Oct. 19, 2016 (JP) .................................. 2016-205503

(51) Int. Cl.
*F16H 1/36* (2006.01)
*B25J 9/10* (2006.01)
*F16H 37/06* (2006.01)
*F16H 1/22* (2006.01)

(52) U.S. Cl.
CPC .............. *B25J 9/102* (2013.01); *F16H 1/222* (2013.01); *F16H 1/36* (2013.01); *F16H 37/06* (2013.01)

(58) Field of Classification Search
CPC .............. F16H 1/36; F16H 37/06; B25J 9/102
See application file for complete search history.

(56) References Cited

FOREIGN PATENT DOCUMENTS

| FR | 2225051 A5 * | 10/1974 | ............... F16H 1/36 |
| JP | 60-23654 A | 2/1985 | |
| JP | 5-56713 U | 7/1993 | |
| JP | 9-89054 A | 3/1997 | |
| JP | 2008-286380 A | 11/2008 | |

OTHER PUBLICATIONS

International Search Report dated Sep. 5, 2017 in PCT/JP2017/023626 filed Jun. 27, 2017.

* cited by examiner

*Primary Examiner* — Sherry L Estremsky
(74) *Attorney, Agent, or Firm* — Xsensus LLP

(57) ABSTRACT

The speed reducer includes: a first sun gear; a second sun gear arranged coaxially with the first sun gear and having a different number of teeth from the first sun gear; a first planetary gear to engage with the first sun gear; a second planetary gear to engage with both the second sun gear and the first planetary gear and having an equal number of teeth to the first planetary gear; and a carrier part to rotatably fix relative positions of shafts of the first sun gear, the first planetary gear, and the second planetary gear and to rotate at a lower rotational speed than the first sun gear. The first sun gear and the second sun gear are rotated in opposite directions at an equal rotational speed.

3 Claims, 5 Drawing Sheets

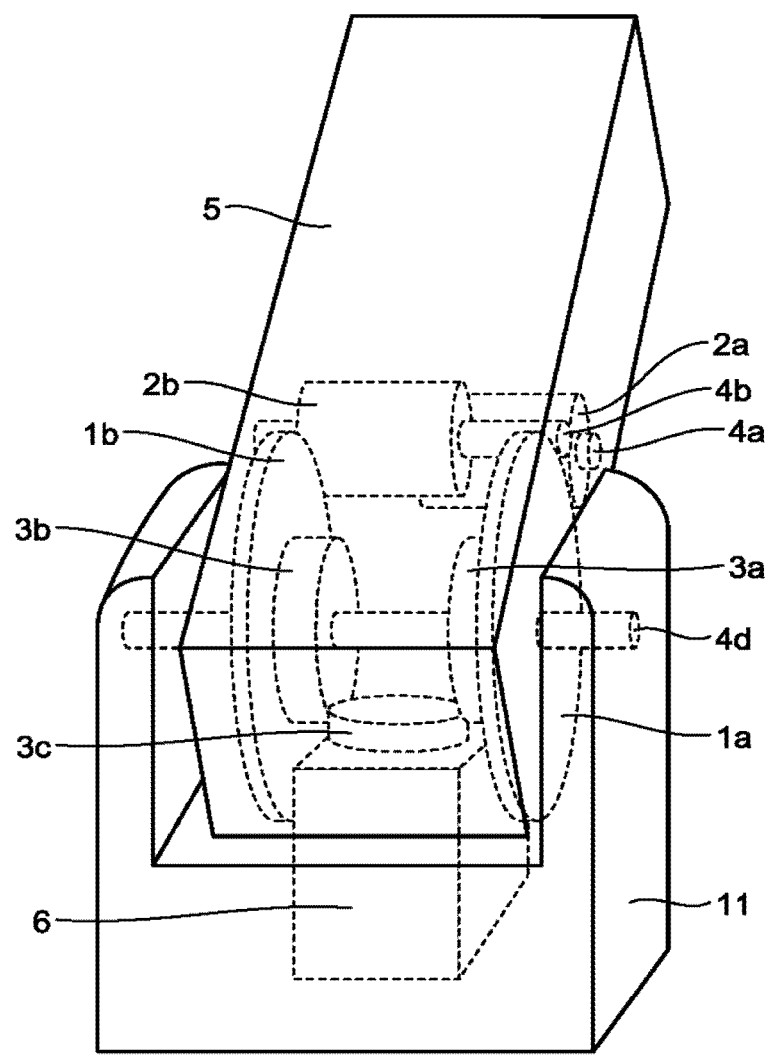

SPEED REDUCER AND ROBOT

FIELD

The present invention relates to a speed reducer used for a robot and a robot equipped with the speed reducer.

BACKGROUND

Electric motors are suitable for high-speed rotation; however, articulated shafts of robots rotate at a lower speed than the electric motors rotate but require high torque. Therefore, an electric motor is applied to an articulated shaft of a robot in combination with a speed reducer in many cases.

In order to maintain accuracy in the rotation direction, a speed reducer for a robot needs to be compact, i.e., small in size, and also needs high rigidity and reduced backlash. Patent Literature 1, which is an example of a conventional technology, discloses a speed reducer with a high reduction ratio that uses mechanical paradox planetary gearing. This is an example of a speed reducer using gearing that satisfies the above-described requirements. In addition, with wave gearing, which is another example of a conventional technology, it is necessary for the speed reducer to be arranged coaxially with the electric motor.

CITATION LIST

Patent Literature

Patent Literature 1: Japanese Patent Application Laid-open No. S60-23654

SUMMARY

Technical Problem

However, with the above-described conventional technology, in the case of using mechanical paradox planetary gearing, the apparatus that includes a speed reducer is increased in size so as to achieve the required reduction ratio of an articulated shaft of a robot. Furthermore, in the case of using wave gearing, it is necessary for a speed reducer to be arranged coaxially with an electric motor and, therefore, the apparatus that includes the speed reducer is increased in size by the length of the electric motor in the axial direction of the articulated shaft. Therefore, there is a problem in that it is difficult to achieve the required reduction ratio of an articulated shaft of a robot while maintaining a reduced size of the apparatus that includes the speed reducer.

The present invention has been made in view of the above, and an object of the present invention is to further downsize, when compared with the conventional technology, an apparatus that includes a speed reducer having a reduction ratio that can be applied to an articulated shaft of a robot.

Solution to Problem

To solve the above-mentioned problem and to achieve the object, a speed reducer according to an aspect of the present invention includes: a first sun gear; a second sun gear arranged coaxially with the first sun gear and having a different number of teeth from the first sun gear; a first planetary gear to engage with the first sun gear; a second planetary gear to engage with both the second sun gear and the first planetary gear and having an equal number of teeth to the first planetary gear; and a carrier part to rotatably fix relative positions of shafts of the first sun gear, the first planetary gear, and the second planetary gear and to rotate at a lower rotational speed than the first sun gear, wherein the first sun gear and the second sun gear are rotated in opposite directions at an equal rotational speed.

Advantageous Effects of Invention

According to the present invention, it is possible to achieve an effect of further downsizing, when compared with the conventional technology, an apparatus that includes a speed reducer having a reduction ratio that can be applied to an articulated shaft of a robot.

BRIEF DESCRIPTION OF DRAWINGS

FIG. 6 is a perspective view illustrating an example of a single-axis robot that is a robot according to a third embodiment.

DESCRIPTION OF EMBODIMENTS

Speed reducers and a robot according to embodiments of the present invention will be described below in detail with reference to the drawings. It should be noted that the present invention is not limited to the embodiments.

First Embodiment

Figure 1:
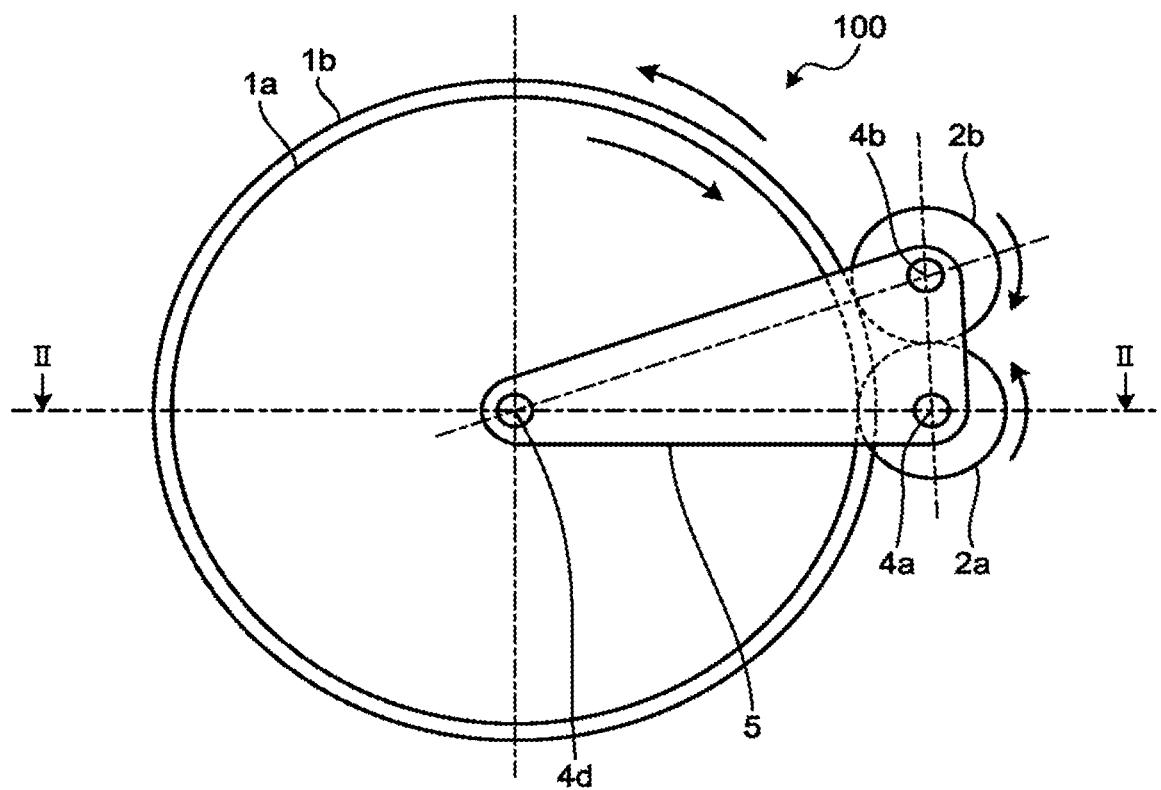
FIG. 1 is a schematic diagram illustrating an example of a speed reducer according to a first embodiment.
Figure 2:
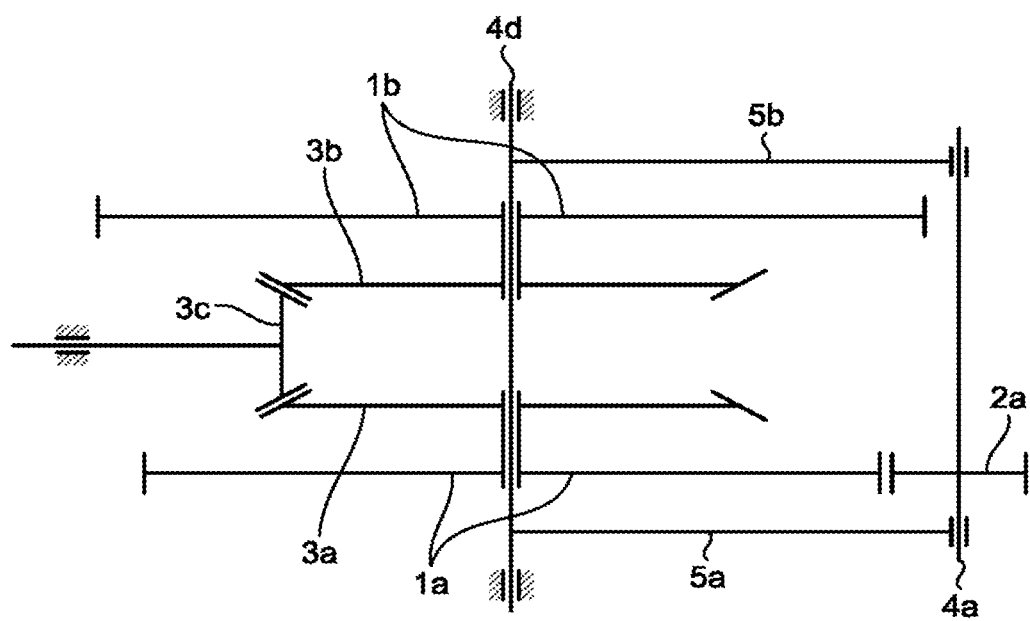
FIG. 2 is a diagram illustrating a cross section taken along line II-II in FIG. 1.

FIG. 1 is a schematic diagram illustrating an example of a speed reducer according to a first embodiment of the present invention. FIG. 2 is a diagram illustrating a cross section taken along line II-II in FIG. 1.

A speed reducer 100 illustrated in FIG. 1 includes a first sun gear 1a, a second sun gear 1b, a first planetary gear 2a, a second planetary gear 2b, and a carrier part 5. The second sun gear 1b is arranged coaxially with the first sun gear 1a, and it has a different number of teeth from the first sun gear 1a. The first planetary gear 2a engages with the first sun gear 1a. The second planetary gear 2b engages with both the second sun gear 1b and the first planetary gear 2a, and it has the same number of teeth as the first planetary gear 2a. The carrier part 5 rotatably fixes the positions of a rotating shaft 4d of the first sun gear 1a and the second sun gear 1b, a rotating shaft 4a of the first planetary gear 2a, and a rotating shaft 4b of the second planetary gear 2b relative to each other, and it rotates at a lower rotational speed than the first sun gear 1a. The first sun gear 1a and the second sun gear 1b rotate in opposite directions at the same rotational speed.

Furthermore, the speed reducer 100 includes a configuration to rotate the first sun gear 1a and the second sun gear 1b in opposite directions at the same rotational speed. A configuration including a first bevel gear 3c, a second bevel gear 3a, and a third bevel gear 3b, as illustrated in FIG. 2, exemplifies such a configuration. In FIG. 2, the carrier part 5 on the front side in FIG. 1 is referred to as a carrier part 5a, and the carrier part 5 on the back side in FIG. 1 is referred to as a carrier part 5b.

The first bevel gear 3c is arranged perpendicularly to both the second bevel gear 3a and the third bevel gear 3b, and it engages with both of them. The second bevel gear 3a is arranged coaxially with the first sun gear 1a, and it rotates in the same rotation direction at the same rotational speed as the first sun gear 1a. The third bevel gear 3b is arranged coaxially with the second sun gear 1b, and it rotates in the same rotation direction at the same rotational speed as the second sun gear 1b.

Incidentally, in the first embodiment, a configuration including bevel gears is cited as an example of a configuration to rotate the first sun gear 1a and the second sun gear 1b in opposite directions at the same rotational speed. However, the present invention is not limited thereto or to any other specific configuration as long as the configuration enables the first sun gear 1a and the second sun gear 1b to rotate in opposite directions at the same rotational speed.

The rotating shaft 4a of the first planetary gear 2a, the rotating shaft 4b of the second planetary gear 2b, and the rotating shaft 4d of the first sun gear 1a and the second sun gear 1b are rotatably attached to the carrier part 5. The relative positions of the rotating shafts 4a, 4b, and 4d are thus fixed by the carrier part 5.

In the configuration of the first embodiment, the first sun gear 1a and the second sun gear 1b have different numbers of teeth, and deceleration is performed by using the difference in the number of teeth. With the configuration of the first embodiment, when the first bevel gear 3c rotates, the first sun gear 1a and the second sun gear 1b rotate via the second bevel gear 3a and the third bevel gear 3b in opposite directions. During the rotations, the first planetary gear 2a and the second planetary gear 2b engage with the first sun gear 1a and the second sun gear 1b, respectively, and revolve around the first sun gear 1a and the second sun gear 1b about the rotating shaft 4d while engaging with each other. As a result, the carrier part 5, which fixes the rotating shafts 4a and 4b of the first planetary gear 2a and the second planetary gear 2b, rotationally moves around the rotating shaft 4d. Thus, it is possible to implement the speed reducer 100 by using the rotating shaft of the first bevel gear 3c as input and the carrier part 5 as output.

In FIG. 1, when the first sun gear 1a rotates clockwise, the other gears rotate in the directions of the arrows illustrated in FIG. 1. Specifically, the first planetary gear 2a rotates counterclockwise, the second planetary gear 2b rotates clockwise, and the second sun gear 1b rotates counterclockwise.

In addition, the rotational speed obtained from the carrier part 5 as output corresponds to the rotational speed resulting from the reduction in the rotational speed of the first sun gear 1a due to the difference in the number of teeth between the first sun gear 1a and the second sun gear 1b. Here, Za is defined as the number of teeth of the first sun gear 1a, and Zb is defined as the number of teeth of the second sun gear 1b. The ratio of the number of rotations of the carrier part 5 to the number of rotations of the first sun gear 1a and the second sun gear 1b is given by $|Za-Zb|/(Za+Zb)$, which is the value obtained by dividing the difference $|Za-Zb|$ in the number of teeth between the first sun gear 1a and the second sun gear 1b by the sum $(Za+Zb)$ of the number of teeth of the first sun gear 1a and the number of teeth of the second sun gear 1b. For example, assuming that Za=101 and Zb=100, then the number of rotations of the carrier part 5 is 1/201 of the number of rotations of the first sun gear 1a and the second sun gear 1b.

As described in the first embodiment, it is possible to implement, by using a differential mechanism, a small-sized speed reducer having a high reduction ratio with the rotating shaft of the first bevel gear 3c as input and the carrier part 5 as output. Furthermore, it is possible to reduce the backlash of the speed reducer by adjusting the clearance in the rotation direction at the time of assembly of the first sun gear 1a and the second sun gear 1b or by elastically bringing the shafts of the planetary gears close to each other.

As described above in the first embodiment, it is possible to implement a speed reducer that has a high reduction ratio and that can also be reduced in size.

Second Embodiment

In a second embodiment, an example configuration in which an electric motor is connected to the speed reducer described above in the first embodiment will be described.

Figure 3:
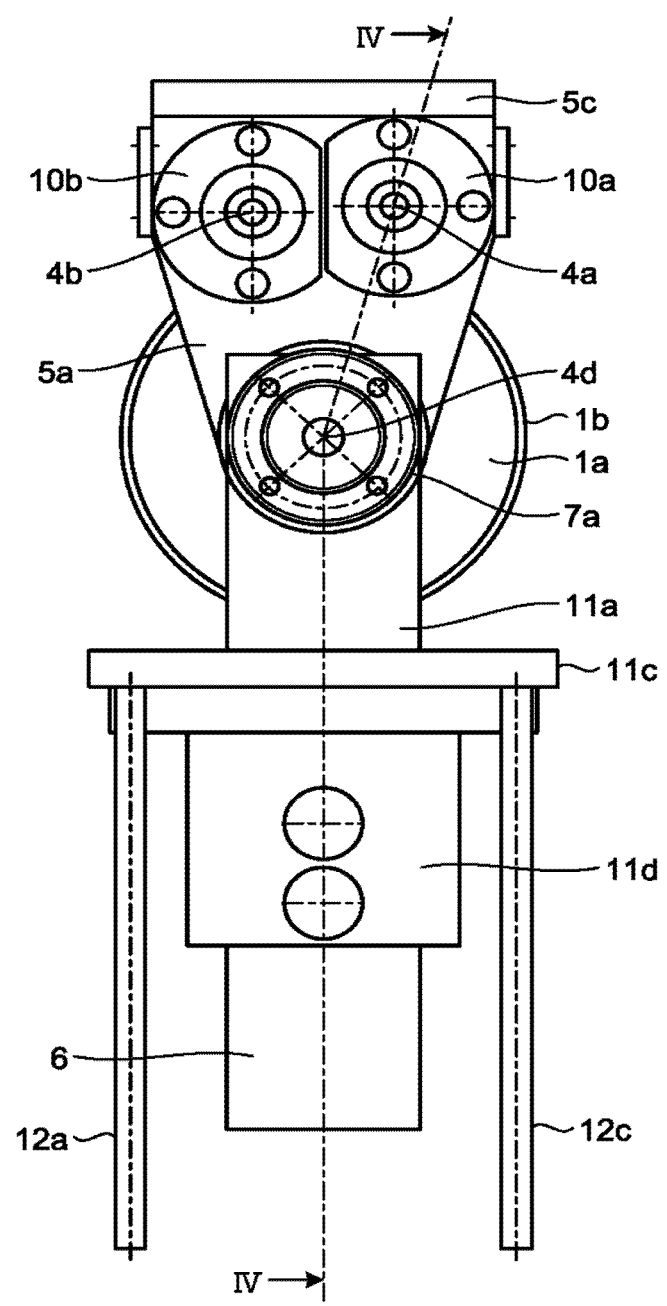
FIG. 3 is a side view illustrating an example of an apparatus that uses a speed reducer according to a second embodiment.
Figure 4:
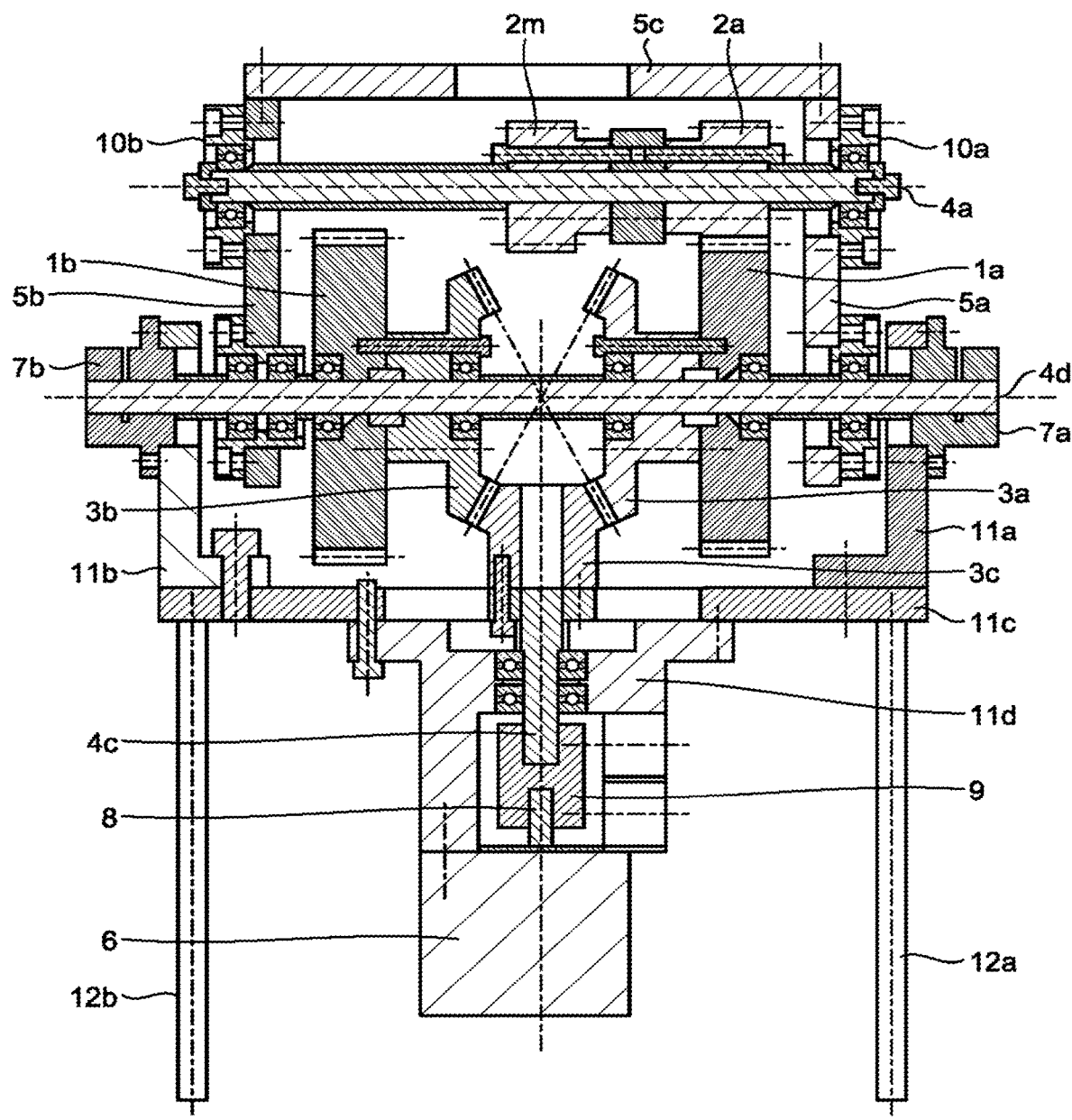
FIG. 4 is a diagram illustrating a cross section taken along line IV-IV in FIG. 3.

FIG. 3 is a side view illustrating an example of an apparatus that uses a speed reducer according to the second embodiment of the present invention. FIG. 4 is a diagram illustrating a cross section taken along line IV-IV in FIG. 3. In FIGS. 3 and 4, the same constituent elements as the constituent elements in FIGS. 1 and 2 are denoted by the same reference signs.

FIG. 3 illustrates the first sun gear 1a, the second sun gear 1b, the rotating shafts 4a, 4b, and 4d, the carrier part 5a, a carrier part 5c, an electric motor 6, a shaft holder 7a, bearing holding parts 10a and 10b, stationary part housings 11a, 11c, and 11d, and device holding parts 12a and 12c. The carrier part 5c is an upper part of the carrier part 5.

FIG. 4 illustrating the cross section taken along line IV-IV in FIG. 3 illustrates the first sun gear 1a, the second sun gear 1b, the first planetary gear 2a, a planetary gear 2m, the first bevel gear 3c, the second bevel gear 3a, the third bevel gear 3b, the rotating shafts 4a and 4d, a rotating shaft 4c, the carrier parts 5a, 5b, and 5c, the electric motor 6, the shaft holder 7a, a shaft holder 7b, a motor shaft 8, a shaft coupling 9, the bearing holding parts 10a and 10b, the stationary part housings 11a, 11c, and 11d, a stationary part housing 11b, the device holding part 12a, and a device holding part 12b. The planetary gear 2m is a part of the first planetary gear 2a extended in its axial direction. The rotating shaft 4c is a rotating shaft coaxial with the motor shaft 8. In addition, the shaft holder 7b is a part disposed on the back side of the shaft holder 7a in FIG. 3. The stationary part housing 11b is a part disposed on the back side of the stationary part housing 11a in FIG. 3. The device holding part 12b is a part disposed on the back side of the device holding part 12a in FIG. 3.

The stationary part housings 11a, 11b, 11c, and 11d are collectively referred to as a stationary part housing 11. Furthermore, in FIG. 3, a device holding part 12d (not illustrated) is disposed on the back side of the device holding part 12c. The device holding parts 12a, 12b, 12c, and 12d are collectively referred to as a device holding part 12.

The stationary part housing 11 is placed and held on a plane surface by the device holding part 12. A stationary part of the electric motor 6; a bearing that supports the rotating shaft 4c, which is coaxial with the motor shaft 8 of the electric motor 6; and the rotating shaft 4d of the first sun gear 1a and the second sun gear 1b are fixed to the stationary part housing 11.

The motor shaft 8 rotates the rotating shaft 4c and the first bevel gear 3c via the shaft coupling 9. The first bevel gear 3c transmits rotation to both the second bevel gear 3a and the third bevel gear 3b. The second bevel gear 3a and the third bevel gear 3b rotate about the rotating shaft 4d as an axis of rotation.

In addition, the second bevel gear 3a is fixed to the first sun gear 1a, and they rotate in the same rotation direction at the same rotational speed. The second bevel gear 3a and the first sun gear 1a are coaxially arranged. Similarly, the third bevel gear 3b is fixed to the second sun gear 1b, and they rotate in the same rotation direction at the same rotational speed. The third bevel gear 3b and the second sun gear 1b are coaxially arranged.

Furthermore, the first sun gear 1a engages with the first planetary gear 2a, and the first planetary gear 2a rotates about the rotating shaft 4a.

Although not illustrated in FIG. 4, the second sun gear 1b engages with the second planetary gear 2b, and the second planetary gear 2b rotates about the rotating shaft 4b. Here, as illustrated as the planetary gear 2m in FIG. 4, the first planetary gear 2a has been extended in its axial direction to a position in the vicinity of the center, and it engages with the second planetary gear 2b, which is similarly extended to a position in the vicinity of the center. Here, the carrier part 5 rotatably fixes the rotating shaft 4d of the first sun gear 1a, the second sun gear 1b, the second bevel gear 3a, and the third bevel gear 3b; the rotating shaft 4a of the first planetary gear 2a; and the rotating shaft 4b of the second planetary gear 2b.

With the configuration illustrated in FIGS. 3 and 4, in which the electric motor 6 is used as input and the carrier part 5 is used as output, it is possible to obtain, from the carrier part 5 as output, rotation resulting from deceleration of the rotation of the electric motor 6. This is because deceleration is performed by two elements, i.e., the first bevel gear 3c and the differential between the first sun gear 1a and the second sun gear 1b. For example, assuming that the number of teeth of the first bevel gear 3c is 20, the number of teeth of the second bevel gear 3a and the third bevel gear 3b is 40, the number of teeth of the first sun gear 1a is 50, and the number of teeth of the second sun gear 1b is 48, then the reduction ratio of the first bevel gear 3c, the second bevel gear 3a, and the third bevel gear 3b is 2, and the reduction ratio due to the differential between the first sun gear 1a and the second sun gear 1b is 49. Therefore, in the present example, the rotational speed of the carrier part 5 is 1/98 of the rotational speed of the electric motor 6.

Figure 5:
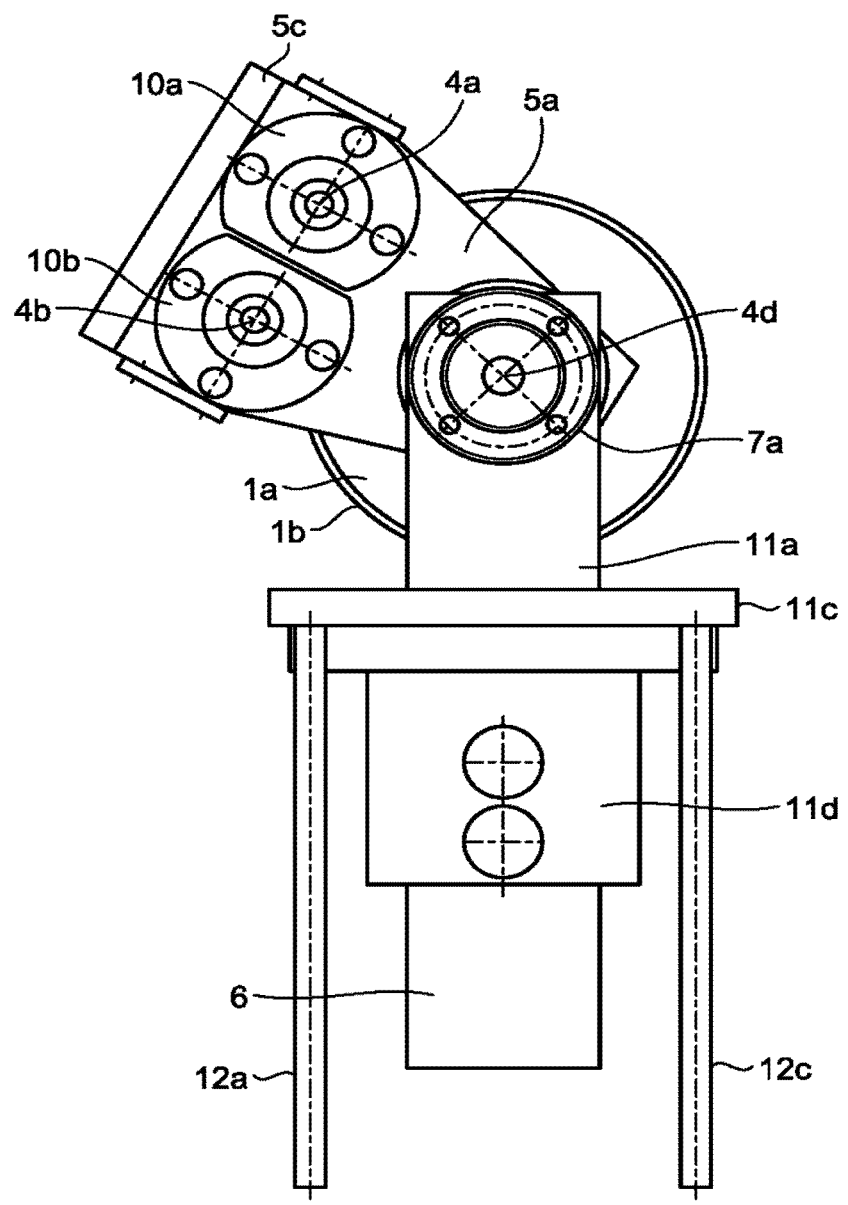
FIG. 5 is a side view of the apparatus illustrated in FIG. 3 with a carrier part thereof having rotated.

FIG. 5 is a side view of the apparatus illustrated in FIG. 3 with the carrier part 5 thereof having rotated. It should be noted that, while the first planetary gear 2a and the second planetary gear 2b need to have the same number of teeth, the number of teeth is not limited to a specific number because the number of teeth does not affect the reduction ratio of the speed reducer.

As described above in the second embodiment, it is possible to implement a speed reducer that has a high reduction ratio, can be reduced in size, and uses the electric motor 6 as input and the carrier part 5 as output.

Third Embodiment

In a third embodiment, a robot to which the apparatus described above in the second embodiment has been applied will be described.

FIG. 6 is a perspective view illustrating an example of a single-axis robot that is a robot according to the third embodiment. In FIG. 6, the same constituent elements as the constituent elements in FIGS. 1 to 4 are denoted by the same reference signs. The robot illustrated in FIG. 6 includes the apparatus according to the second embodiment. In the robot illustrated in FIG. 6, the next link is disposed in the longitudinal direction of the motor shaft fixed to the stationary part housing 11; the stationary part housing 11 is fixed to a base; and the stationary part of the electric motor 6 and the rotating shaft 4d of the speed reducer are fixed to the stationary part housing 11.

The carrier part 5 rotates or linearly moves with respect to the stationary part housing 11, and it forms an articulated shaft having a reduction ratio with respect to the rotation of the electric motor 6. The carrier part 5 rotates about the rotating shaft 4d at a rotational speed resulting from the reduction of the rotational speed of the electric motor 6.

According to the third embodiment, the next link of the robot can be placed in the longitudinal direction of the output shaft of the electric motor 6 as illustrated in FIG. 6. Therefore, it is possible to dispose the electric motor 6 in the longitudinal direction of an arm and to downsize the arm accordingly.

Thus, the robot according to the third embodiment can be reduced in size at low cost.

Speed reducers using wave gearing are often used for industrial robots that require accuracy. The robot according to the third embodiment includes a spur gear and a bevel gear, and it uses no wave gearing. Therefore, the robot according to the third embodiment can be implemented at a lower cost than a robot using a speed reducer with wave gearing.

Furthermore, when mechanical paradox planetary gearing is used, the apparatus that includes a speed reducer is increased in size so as to increase the reduction ratio. In addition, when wave gearing is used, it is necessary for the electric motor 6 and the speed reducer to be coaxially arranged, and the apparatus that includes the speed reducer is thus increased in size. When the apparatus that includes the speed reducer is a robot, it is necessary to increase the width of the robot arm. In the robot according to the third embodiment, it is possible to dispose the electric motor 6 in the longitudinal direction of the arm as illustrated in FIG. 6 without using mechanical paradox planetary gearing. Therefore, in the robot according to the third embodiment, the width of the arm can be reduced.

The configuration illustrated in each of the above embodiments illustrates an example of the subject matter of the present invention, and it is possible to combine the configuration with another technique that is publicly known, and is also possible to make omissions and changes to part of the configuration without departing from the gist of the present invention.

REFERENCE SIGNS LIST 1a first sun gear; 1b second sun gear; 2a first planetary gear; 2b second planetary gear; 2m planetary gear; 3a second bevel gear; 3b third bevel gear; 3c first bevel gear; 4a, 4b, 4c, 4d rotating shaft; 5, 5a, 5b, 5c carrier part; 6 electric motor; 7a, 7b shaft holder; 8 motor shaft; 9 shaft coupling; 10a, 10b bearing holding part; 11, 11a, 11b, 11c, 11d stationary part housing; 12, 12a, 12b, 12c, 12d device holding part; 100 speed reducer.

The invention claimed is:

1. A speed reducer comprising:
   a first sun gear;
   a second sun gear arranged coaxially with the first sun gear and having a different number of teeth from the first sun gear;

a first planetary gear to engage with the first sun gear;

a second planetary gear to engage with both the second sun gear and the first planetary gear and having an equal number of teeth to the first planetary gear; and a carrier part to rotatably fix relative positions of shafts of the first sun gear, the first planetary gear, and the second planetary gear and to rotate at a lower rotational speed than the first sun gear, wherein the first sun gear and the second sun gear are rotated in opposite directions at an equal rotational speed.

2. The speed reducer according to claim 1, further comprising:

a first bevel gear rotated by an electric motor;

a second bevel gear rotated by the first bevel gear about a shaft perpendicular to a rotating shaft of the electric motor; and a third bevel gear to rotate in a direction opposite to a direction of rotation of the second bevel gear, the third bevel gear engaging with the first bevel gear and being arranged coaxially with the second bevel gear, wherein the first sun gear is fixed to the second bevel gear and rotates coaxially with the second bevel gear, and the second sun gear is fixed to the third bevel gear and rotates coaxially with the third bevel gear.

3. A robot comprising:

the speed reducer according to claim 2; and a stationary part housing that fixes the electric motor, wherein the carrier part rotates or linearly moves with respect to the stationary part housing and forms an articulated shaft having a reduction ratio with respect to rotation of the electric motor.

\* \* \* \* \*